(12) United States Patent
Brusatore

(10) Patent No.: US 7,984,586 B2
(45) Date of Patent: *Jul. 26, 2011

(54) APPARATUS FOR GROWING PLANTS

(75) Inventor: Nicholas Gordon Brusatore, Port Moody (CA)

(73) Assignee: Terrasphere Systems LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,059

(22) Filed: Oct. 25, 2010

(65) Prior Publication Data

US 2011/0061294 A1 Mar. 17, 2011

Related U.S. Application Data

(63) Continuation of application No. 12/382,815, filed on Mar. 24, 2009, now Pat. No. 7,818,917.

(30) Foreign Application Priority Data

Mar. 23, 2009 (CA) .................................... 2659658

(51) Int. Cl.
*A01G 31/00* (2006.01)
(52) U.S. Cl. ...................................... 47/59 R
(58) Field of Classification Search ............ 47/59 R
See application file for complete search history.

(56) References Cited

U.S. PATENT DOCUMENTS

| | | |
|---|---|---|
| 1,500,917 A | 7/1924 | Bell |
| 3,254,447 A | 6/1966 | Ruthner |
| 3,339,308 A | 9/1967 | Clare |
| 3,529,379 A | 9/1970 | Ware |
| 3,667,157 A | 6/1972 | Longhini |
| 3,747,268 A | 7/1973 | Linder |
| 3,909,978 A | 10/1975 | Fleming |
| 3,973,353 A | 8/1976 | Dedolph |
| 4,085,544 A | 4/1978 | Blake |
| 4,255,897 A | 3/1981 | Ruthner |
| 4,356,664 A | 11/1982 | Ruthner |
| 5,157,869 A | 10/1992 | Minton |
| 5,165,364 A | 11/1992 | Horkey |
| 5,372,474 A | 12/1994 | Miller |
| 5,491,929 A | 2/1996 | Peacock et al. |
| 5,515,648 A | 5/1996 | Sparkes |
| 5,584,141 A | 12/1996 | Johnson |

(Continued)

FOREIGN PATENT DOCUMENTS

CA 2343254 C 3/2002

(Continued)

OTHER PUBLICATIONS

E-mail dated Jun. 5, 2008, from Elson Silva, PhD, to Dinesh Agarwal (8 pp.).

(Continued)

*Primary Examiner* — Francis T Palo
(74) *Attorney, Agent, or Firm* — Dinesh Agarwal, P.C.; John E. Lynch, Esq.

(57) ABSTRACT

Method and apparatus for growing plants in a rotatable, horizontal, drum-like configuration, wherein plants grow inwards towards a centrally located light source, includes plant receiving hollow members each having a recessed slot facing the light source with a plurality of apertures at the base thereof for receiving plant holders and defining, with the outer walls of the hollow member, reservoirs on each side thereof for holding water when the plants are generally inverted.

6 Claims, 14 Drawing Sheets

U.S. PATENT DOCUMENTS

| | | | |
|---|---|---|---|
| 5,617,673 | A | 4/1997 | Takashima |
| 5,862,628 | A | 1/1999 | Takashima |
| 6,378,246 | B1 | 4/2002 | DeFoor |
| 6,394,030 | B1 | 5/2002 | Geiger et al. |
| 6,557,491 | B1 | 5/2003 | Weiser et al. |
| 6,604,321 | B2 | 8/2003 | Marchildon |
| 6,766,817 | B2 | 7/2004 | da Silva |
| 6,837,002 | B2 | 1/2005 | Costa |
| 6,840,007 | B2 * | 1/2005 | Leduc et al. ............... 47/62 C |
| 6,918,404 | B2 | 7/2005 | Dias da Silva |
| 6,928,772 | B2 | 8/2005 | Bai et al. |
| 6,951,076 | B2 | 10/2005 | Winsbury |
| 6,983,562 | B2 | 1/2006 | Sanderson |
| 7,066,586 | B2 | 6/2006 | da Silva |
| 7,143,544 | B2 | 12/2006 | Roy |
| 7,168,206 | B2 | 1/2007 | Agius |
| 7,181,886 | B2 | 2/2007 | Bourgoin et al. |
| 7,188,451 | B2 | 3/2007 | Marchildon |
| 7,285,255 | B2 | 10/2007 | Kadlec et al. |
| 7,401,437 | B2 | 7/2008 | Dumont |
| 7,415,796 | B2 | 8/2008 | Brusatore |
| 7,488,098 | B2 | 2/2009 | Dumont |
| 7,533,493 | B2 | 5/2009 | Brusatore |
| 7,559,173 | B2 | 7/2009 | Brusatore |
| 7,818,917 | B2 * | 10/2010 | Brusatore ............... 47/59 R |
| 2002/0144461 | A1 | 10/2002 | Marchildon |
| 2004/0111965 | A1 | 6/2004 | Agius |
| 2004/0163308 | A1 | 8/2004 | Uchiyama |
| 2005/0011119 | A1 | 1/2005 | Bourgoin et al. |
| 2005/0039396 | A1 | 2/2005 | Marchildon |
| 2005/0039397 | A1 | 2/2005 | Roy |
| 2005/0055878 | A1 | 3/2005 | Dumont |
| 2005/0257424 | A1 | 11/2005 | Bissonnette et al. |
| 2006/0150481 | A1 | 7/2006 | Hung et al. |
| 2006/0196118 | A1 | 9/2006 | Brusatore |
| 2006/0230674 | A1 | 10/2006 | Marchildon |
| 2006/0272210 | A1 | 12/2006 | Bissonnette et al. |
| 2007/0141912 | A1 | 6/2007 | Dumont |
| 2007/0212281 | A1 | 9/2007 | Kadlec et al. |
| 2007/0251145 | A1 | 11/2007 | Brusatore |
| 2007/0271842 | A1 | 11/2007 | Bissonnette et al. |
| 2008/0015531 | A1 | 1/2008 | Hird et al. |
| 2008/0110088 | A1 | 5/2008 | Brusatore |
| 2008/0222949 | A1 | 9/2008 | Bissonnette et al. |
| 2010/0236147 | A1 | 9/2010 | Brusatore |

FOREIGN PATENT DOCUMENTS

| | | | |
|---|---|---|---|
| CA | 2396317 | A1 | 8/2002 |
| CA | 2412073 | A1 | 5/2004 |
| CA | 2503705 | C | 6/2004 |
| CA | 2431523 | A1 | 9/2004 |
| CA | 2536116 | A1 | 2/2005 |
| FR | 2240684 | | 3/1975 |
| FR | 2345912 | | 10/1977 |
| FR | 2680074 | A1 | 2/1993 |
| GB | 2269304 | A | 2/1994 |
| JP | 4229111 | A | 8/1992 |
| JP | 2001128571 | A | 5/2001 |
| RU | 2034448 | C | 5/1995 |
| SU | 420288 | | 3/1974 |
| SU | 650557 | | 3/1979 |
| SU | 914004 | B | 3/1982 |
| SU | 1722301 | A1 | 3/1992 |
| WO | WO 2006/096650 | | 9/2006 |
| WO | WO 2008/156538 | | 12/2008 |
| WO | WO 2010/110844 | | 9/2010 |

OTHER PUBLICATIONS

PCT International Search Report and the Written Opinion in International App. No. PCT/US06/07945, dated May 8, 2007 (10 pp.).

PCT International Search Report and the Written Opinion in International App. No. PCT/US08/06416, dated Sep. 29, 2008 (9 pp.).

Office Action dated Oct. 2, 2006, issued in U.S. Appl. No. 11/073,562, filed Mar. 8, 2005.

Office Action dated Dec. 21, 2006, issued in U.S. Appl. No. 11/073,562, filed Mar. 8, 2005.

Office Action dated Jun. 6, 2007, issued in U.S. Appl. No. 11/073,562, filed Mar. 8, 2005.

Advisory Action dated Oct. 19, 2007, issued in U.S. Appl. No. 11/073,562, filed Mar. 8, 2005.

Office Action dated Jan. 22, 2008, issued in U.S. Appl. No. 11/073,562, filed Mar. 8, 2005.

Office Action dated Nov. 24, 2008, issued in U.S. Appl. No. 11/808,787, filed Jun. 13, 2007.

Derwent Abstract Accession No. 93-065376/08, SU 1722301 A1 (Bozhok) Mar. 30, 1992 (2 pp.).

International Preliminary Examination Report for PCT/AU02/00097, dated Apr. 30, 2002 (6 pp.).

PCT International Search Report for International App. No. PCT/AU02/00097, dated Mar. 1, 2002 (2 pp.).

PCT International Search Report and the Written Opinion in International App. No. PCT/US10/00704, dated May 18, 2010 (9 pp.).

* cited by examiner

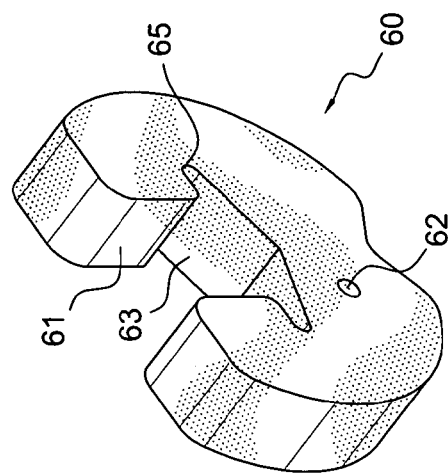
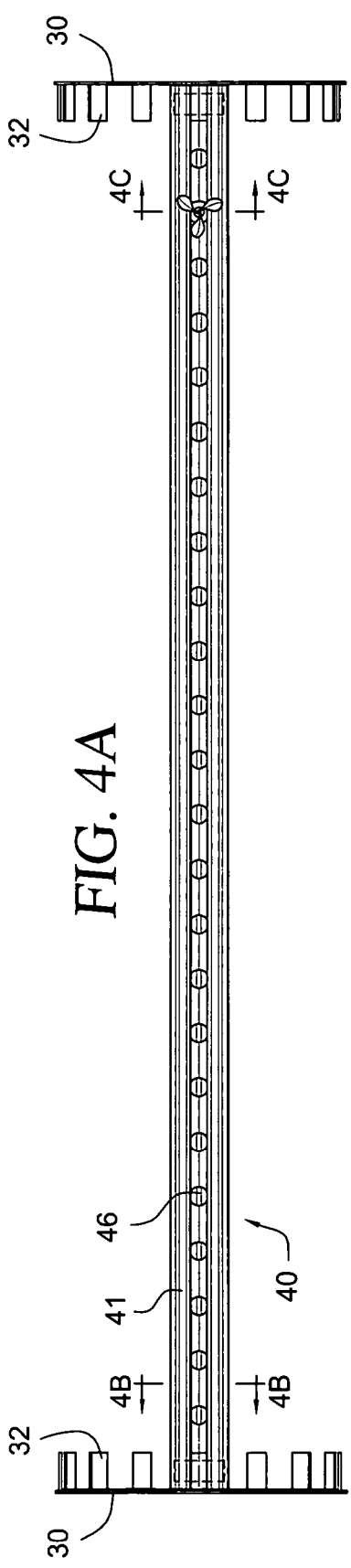
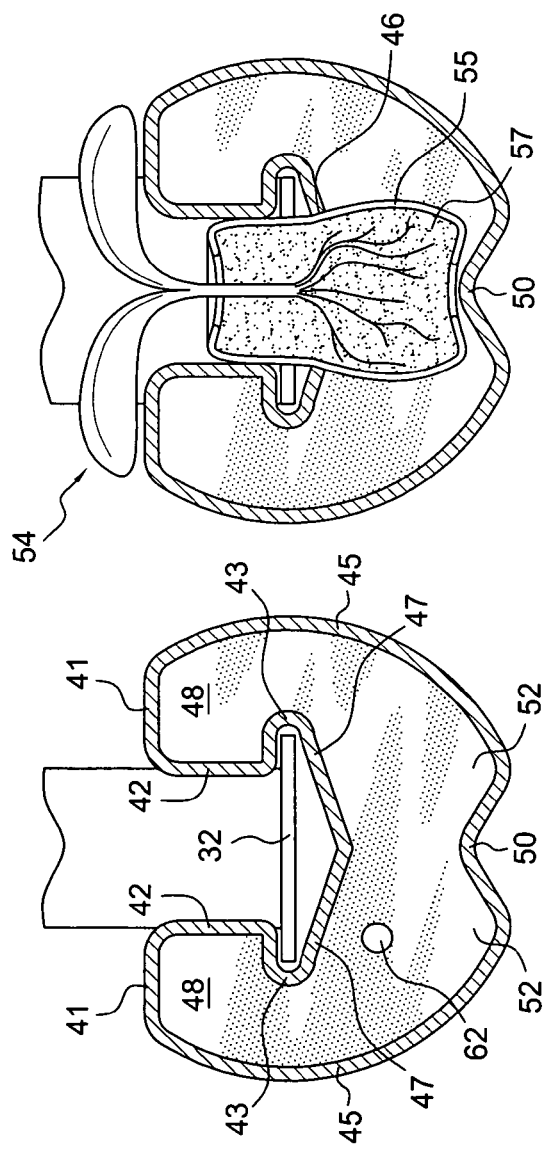

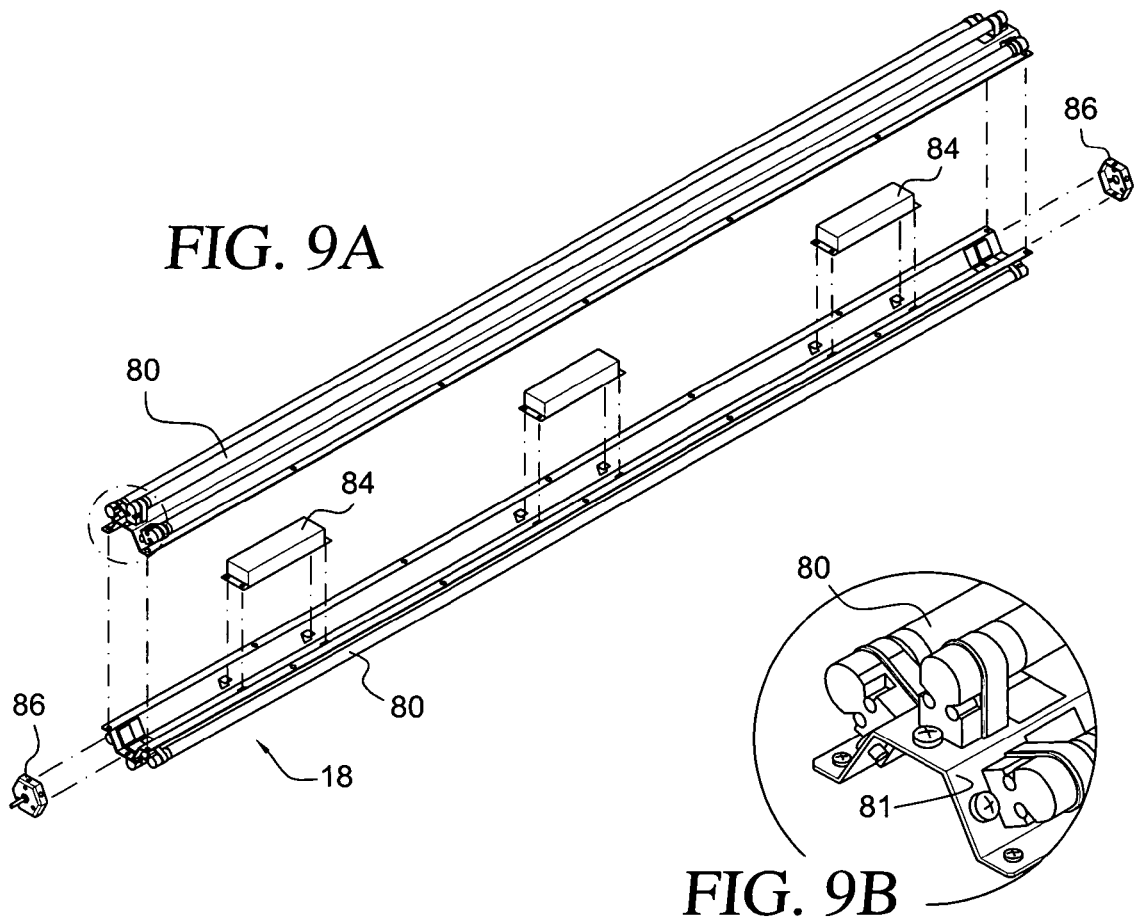
FIG. 9A
FIG. 9B
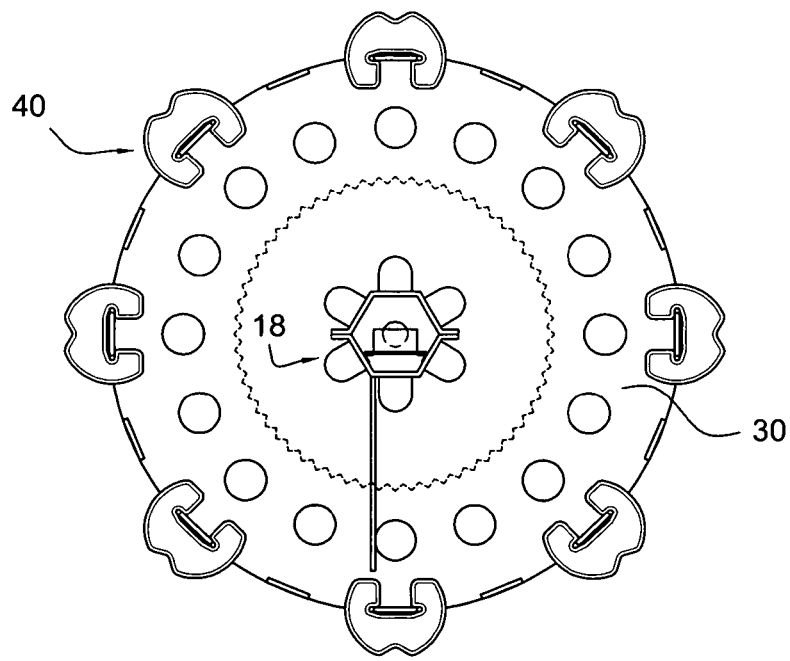
FIG. 9C

US 7,984,586 B2

APPARATUS FOR GROWING PLANTS

CROSS-REFERENCE TO RELATED APPLICATIONS

This is a continuation of application Ser. No. 12/382,815, filed Mar. 24, 2009, now U.S. Pat. No. 7,818,917, which is hereby incorporated herein in its entirety by reference.

FIELD OF THE INVENTION

This invention relates to growing plants under controlled conditions.

SUMMARY OF THE INVENTION

The invention provides a linear, hollow member for growing plants having a recessed slot with a plurality of apertures at the base thereof for receiving plant holders and defining, with the outer walls of the hollow member, reservoirs on each side thereof for holding water when the plants are generally inverted.

The hollow members are suitable for use in apparatus for growing plants in a rotatable, horizontal, drum-like configuration forming plant arrays wherein plants grow inwards towards a centrally located light source.

Preferred apparatus for growing plants utilizes hollow members in drum-like configurations forming plant arrays in a vertical carousel which includes means to rotate the arrays within the carousel, means to move the arrays within the carousel, generally in and out of a work station for cropping and replanting and means to deliver water to the interior of the hollow members.

In further preferred embodiments, the hollow member has a raised rib opposite the slot which can advantageously be used as a bottom for plants in plant holders inserted into the slot apertures. The rib can also form further reservoirs on each side thereof for holding water when plants are generally upright.

End caps enclose the hollow members and provide a convenient location for injecting water into the interior. It is preferred to deliver water simultaneously to all the hollow members in an array to maintain even weight distribution within each array for smooth, balanced rotation.

In a further embodiment, the recessed slot of the hollow member includes lateral grooves for mounting hollow members in an array. To facilitate mounting, vertical end members have spaced mounting tabs adjacent the periphery of each end member. The lateral grooves receive the mounting tabs which extend inwardly at a right angle to the end members. The mounting tabs of one end member allow sliding movement of a hollow member beyond the plane of the one end member when the mounting tabs engage the lateral grooves which facilitates the same engagement at the other of the end members.

The invention also provides a method for growing plants in a vertical carousel of rotatable plant arrays having a growth promoting light source at the center of each array which includes:

(a) providing arrays having a plurality of hollow members in a horizontal, drum-like configuration which carry plants that grow inwards towards the light source, each hollow member having a recessed slot facing said light source having a plurality of apertures at the base thereof containing plants in plant holders and defining, with the outer walls of the hollow member, reservoirs on each side thereof for holding water when the plants are generally inverted;

(b) rotating the arrays within the carousel;
(c) moving the arrays within the carousel; and
(d) delivering water for the plants to the interior of said hollow members. Water is preferably delivered to the interior of all the hollow members in an array at the same time to maintain even weight distribution for smooth, balance rotation.

The configuration of the hollow member is robust and can be used in long lengths. For example, the length to diameter ratio of an array can be about 4 to 1 or greater. Thus an array two feet in diameter can employ hollow members eight feet in length.

BRIEF DESCRIPTION OF THE DRAWINGS

The following drawings show preferred embodiments and are not intended to restrict or otherwise limit the invention in any way. All known functional equivalents of components or elements disclosed or shown herein are within the intent and scope of the invention.

FIG. 4A is a top plan view of a hollow, plant carrying member of the invention;

FIG. 4B is a sectional view taken along line 4B-4B of FIG. 4A;

FIG. 4C is another sectional view taken along line 4C-4C showing a plant holder and plant in place in the hollow member;

FIG. 4E is a perspective view of a preferred end cap for the hollow member of FIG. 4A;

FIGS. 9A-C are three views of a light source that can be used in the invention;

DESCRIPTION OF PREFERRED EMBODIMENTS

Figure 1:
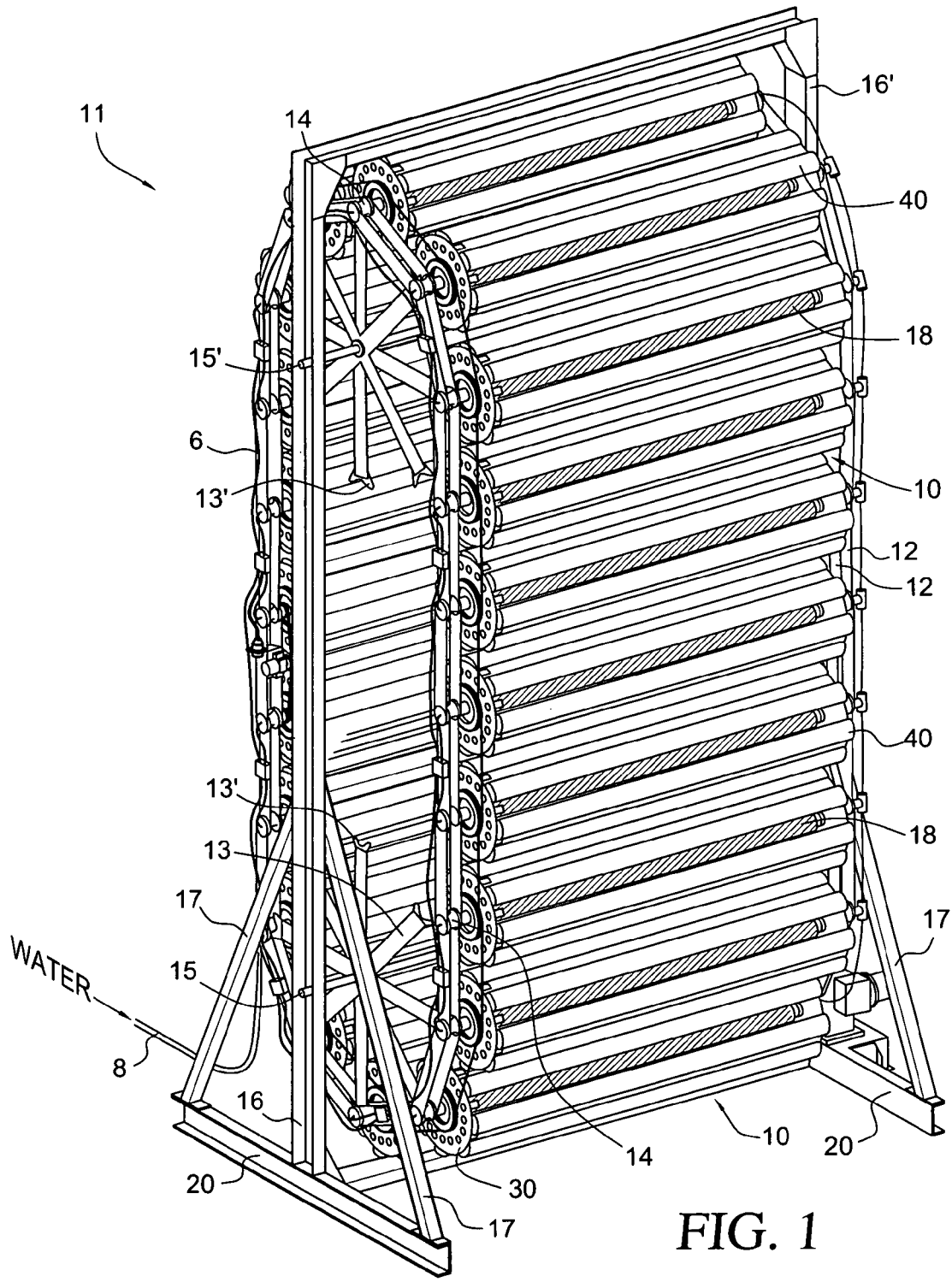
FIG. 1 is a perspective view showing a vertical carousel arrangement of horizontally rotatable plant arrays.
Figure 2:
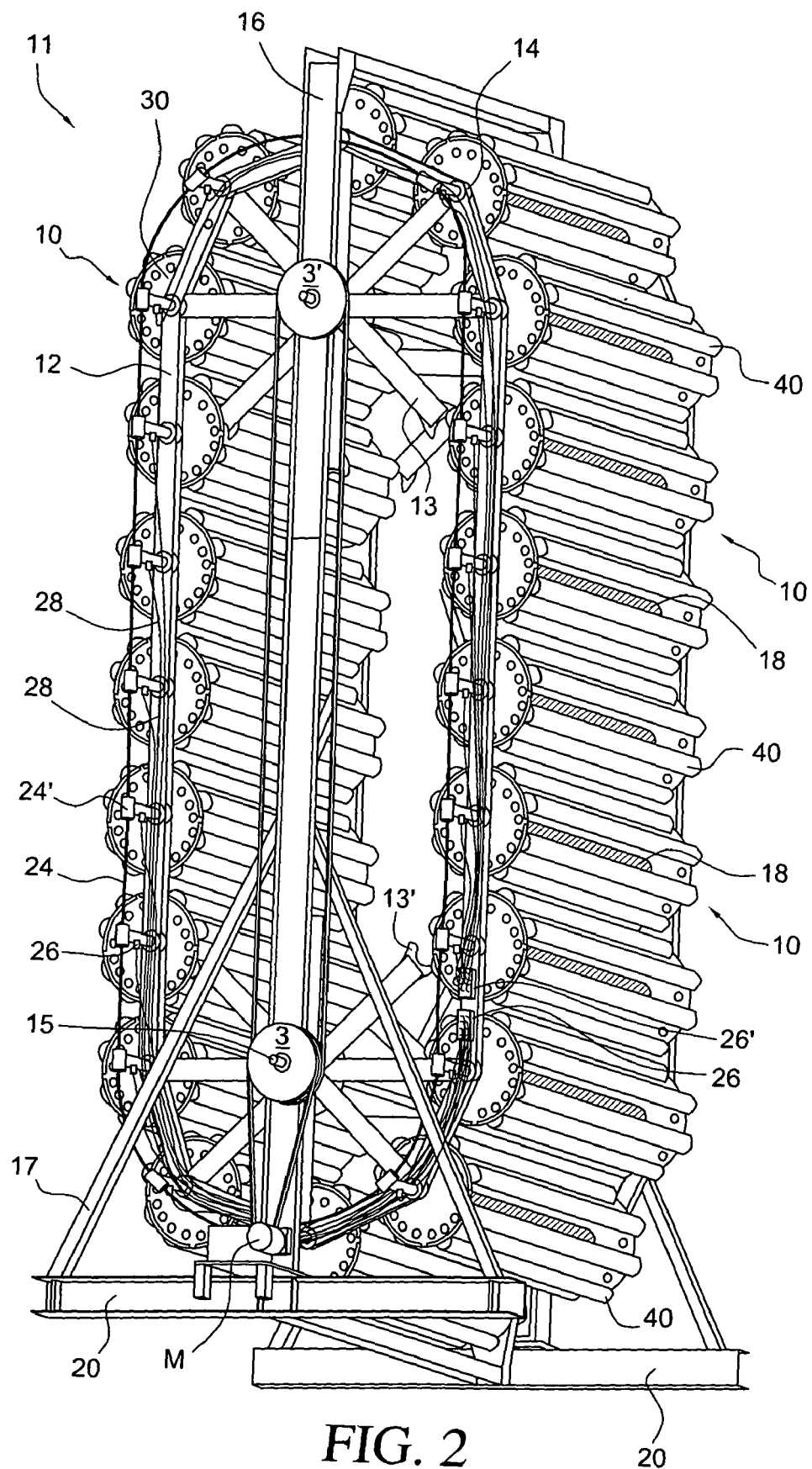
FIG. 2 is perspective view from the opposite side of the carousel of FIG. 1.

Referring now to the drawings, FIGS. 1 and 2 show carousel 11 containing twenty plant arrays 10 each made of spaced apart hollow members 40 which carry growing media and growing plants. The arrays 10 are mounted for tandem movement or circulation within a carousel by means of lower and upper shafts 15 and 15' carried by frame members 16 and 16' and base members 17 and 20, sprocket arms 13 and 13' and links 12 interconnecting via member 14 arrays 10 in each carousel. Water input assemblies (FIGS. 6A, 6B and 7) are located on one side of a carousel (FIG. 2) and electrical input bearing assemblies are located on the other side of a carousel (FIG. 1).

Figure 6A:
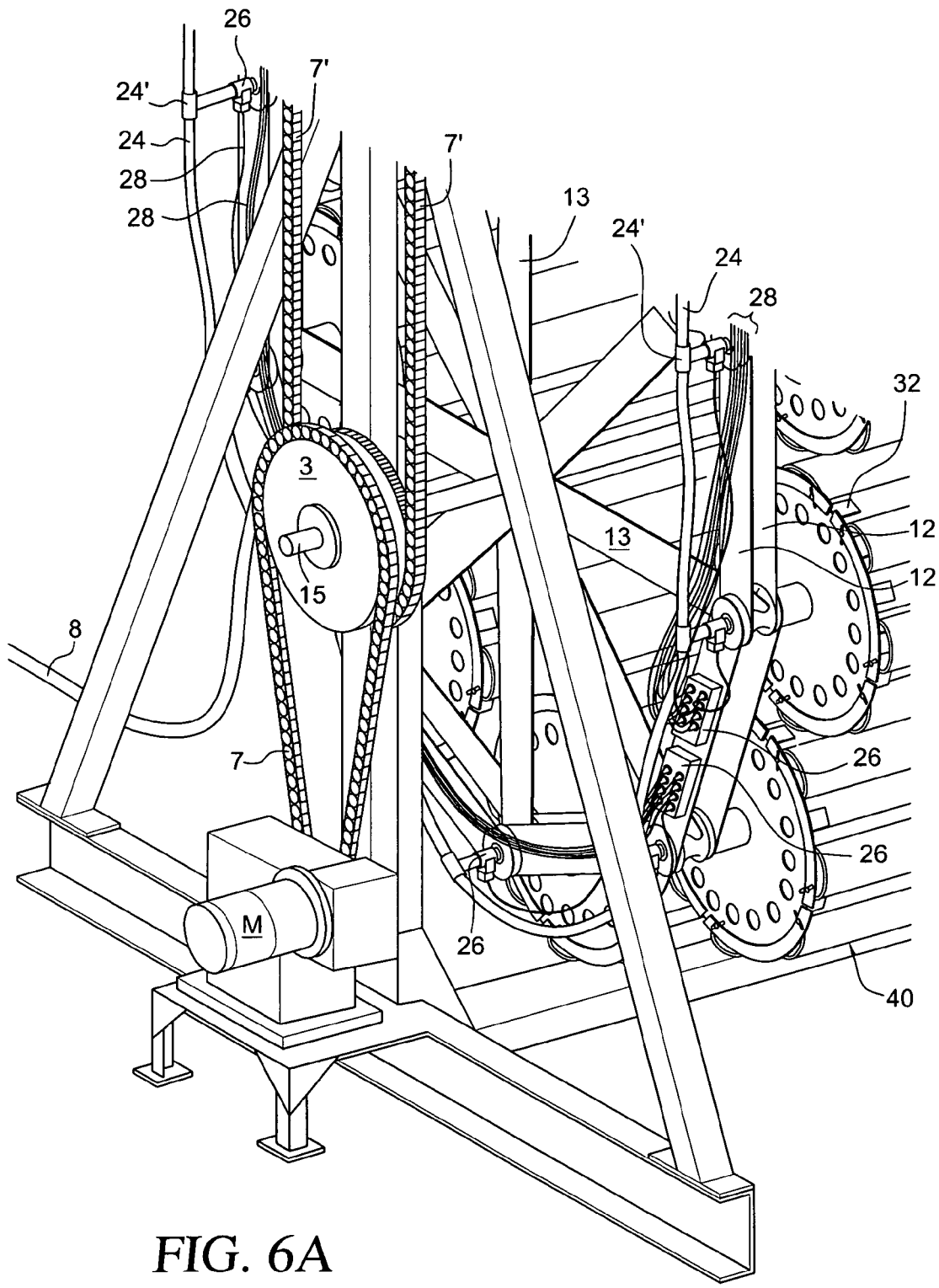
FIG. 6A is an enlarged, broken away view of a portion of the carousel shown in FIG. 2.
Figure 6B:
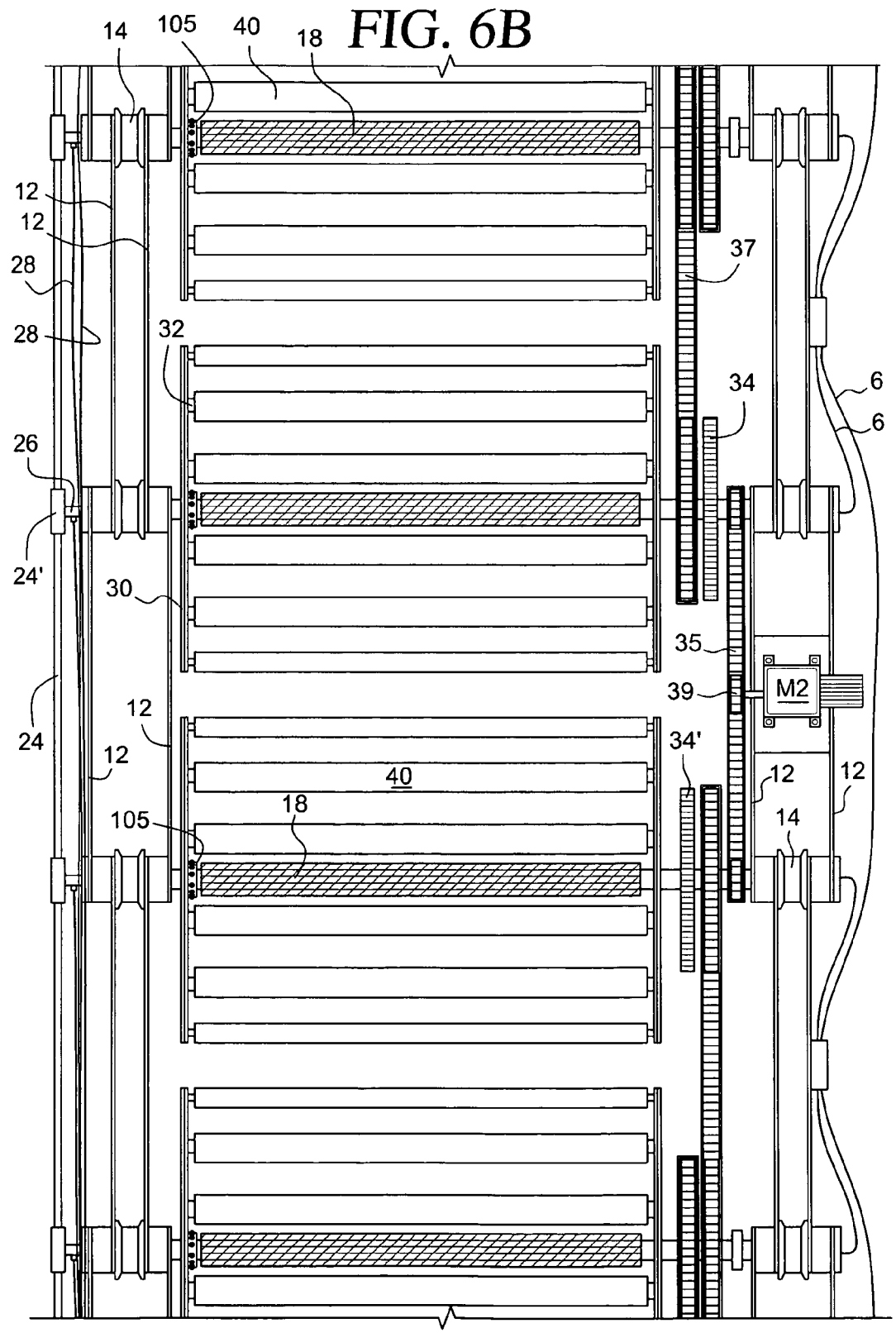
FIG. 6B is a front plan view, partly broken away, of the carousel shown in FIGS. 1 and 2.

Sprocket arms 13 are mounted on drive shafts 15 and 15' and ends 13' of each arm 13 engage bearings 14 located between pairs of links 12 (FIG. 6B).

Figure 10:
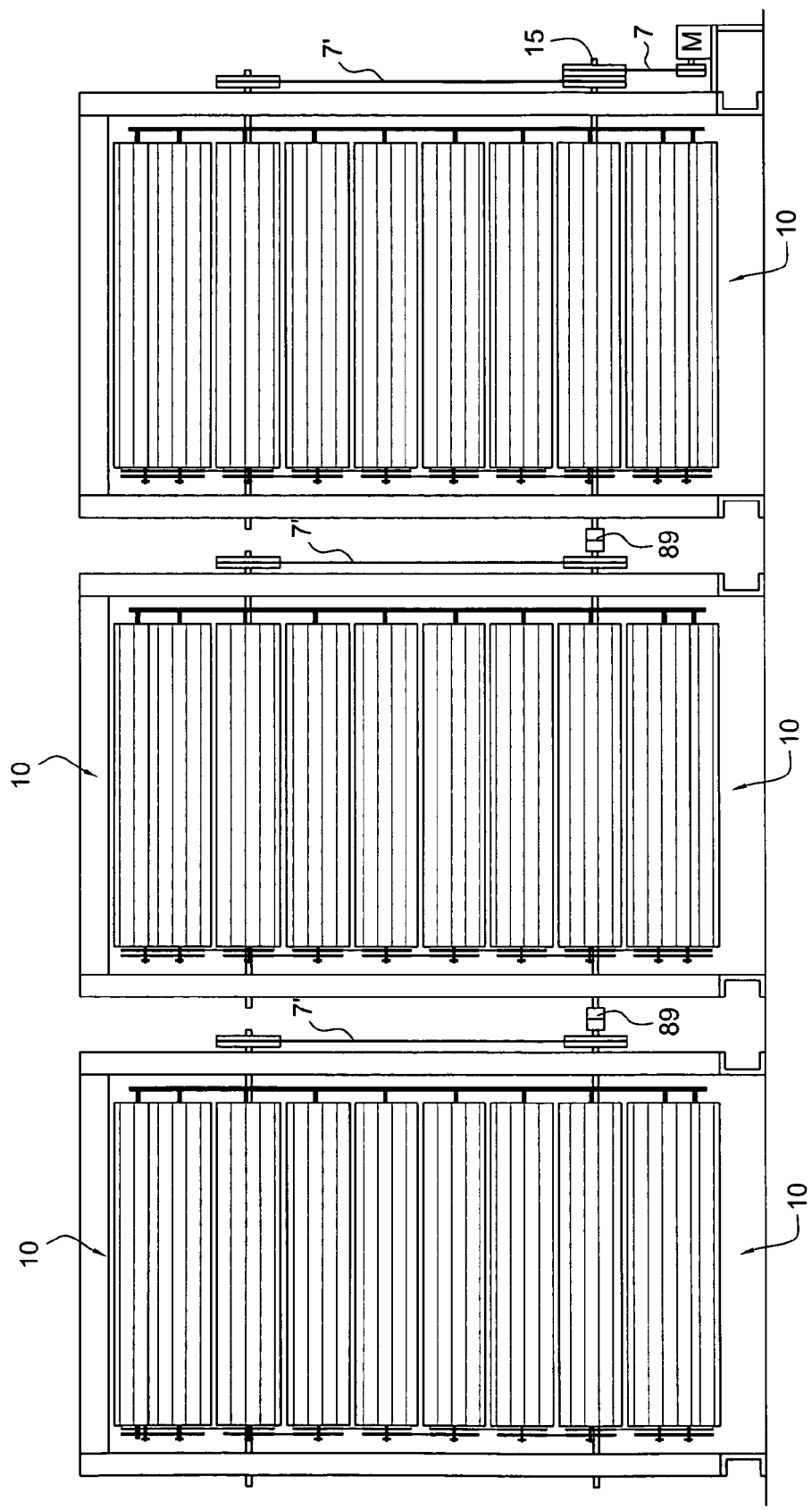
FIG. 10 is a front plan view showing three side-by-side carousels as shown in FIGS. 1 and 2 interconnected for common operation.

Shafts 15 and 15' can be joined via quick-connecting couplers 89 and 89' when carousels are ganged together from common operation (FIG. 10). As shown, shafts 15 and 15' are rotated via chains 7 and 7' and gear wheels 3 and 3' by a common variable-speed clutch motor and gearbox M (FIG. 2) to circulate or move all the arrays 10 in a bank of carousels at once. In this fashion, individual arrays 10 can be moved into and out of an operator station located at an appropriate height from the floor to facilitate cropping, replanting and plant maintenance.

Figure 3:
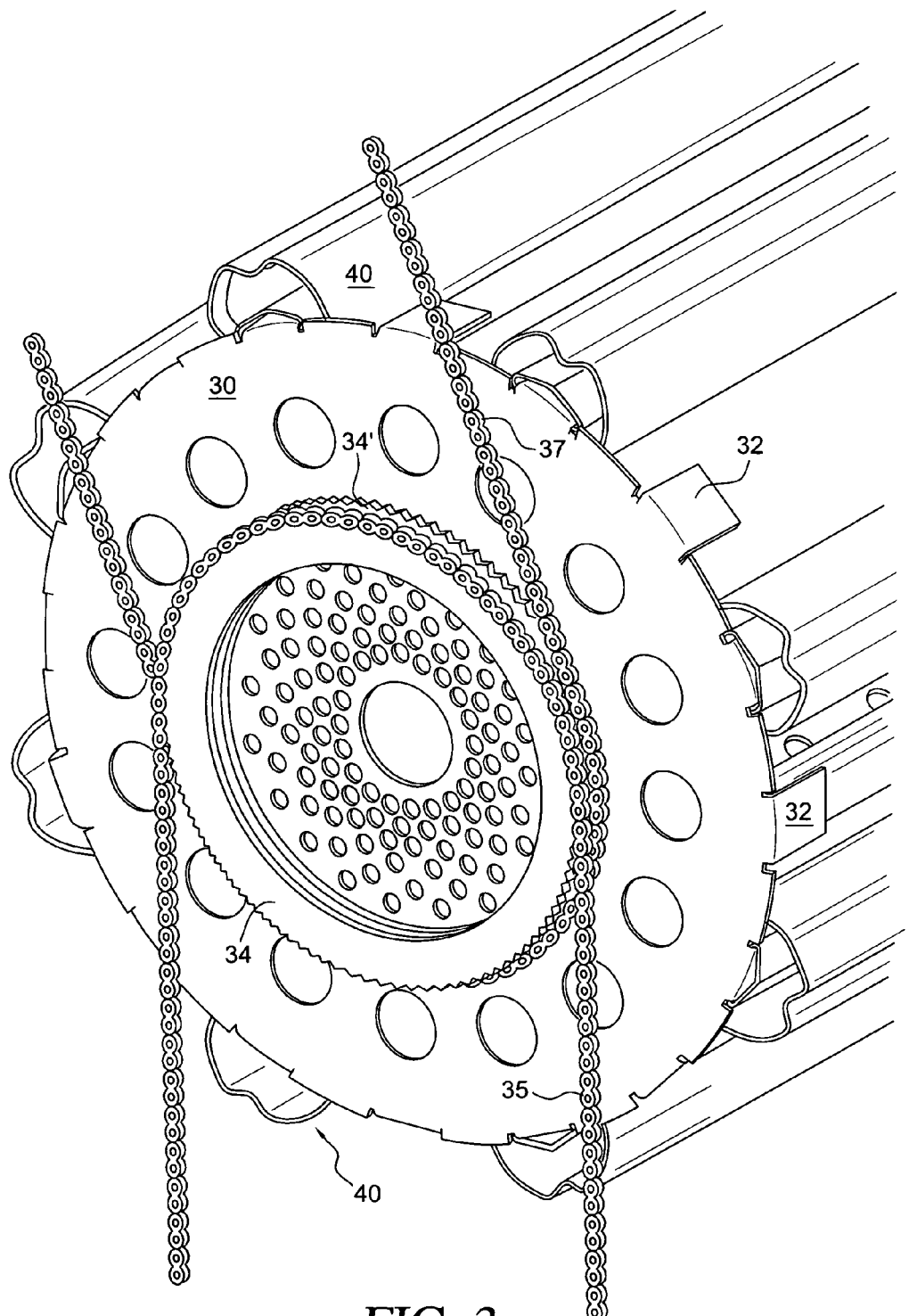
FIG. 3 is a partly broken away perspective end view of a plant array as shown in FIG. 1.

To rotate arrays 10 in a carousel at the same time and at the same rate of rotation, drive wheel 39 is driven by variable-speed motor M2 which is mounted between a pair of links 12 for movement with the arrays (FIG. 6B). Wheel 39 drives chain 35 which in turn drives wheels 39' on shafts central to each array which are located between bearings 14 above and below a pair of arrays 10 (FIGS. 3 and 6B). Pairs of drive wheels 34 and 34' are carried by the same shafts and rotate the next above and next below arrays. This arrangement continues in opposite directions, as show in FIG. 6B, around the entire carousel thus equally dividing he output of motor M2 between groups of ten arrays each in each carousel.

Figure 4D:
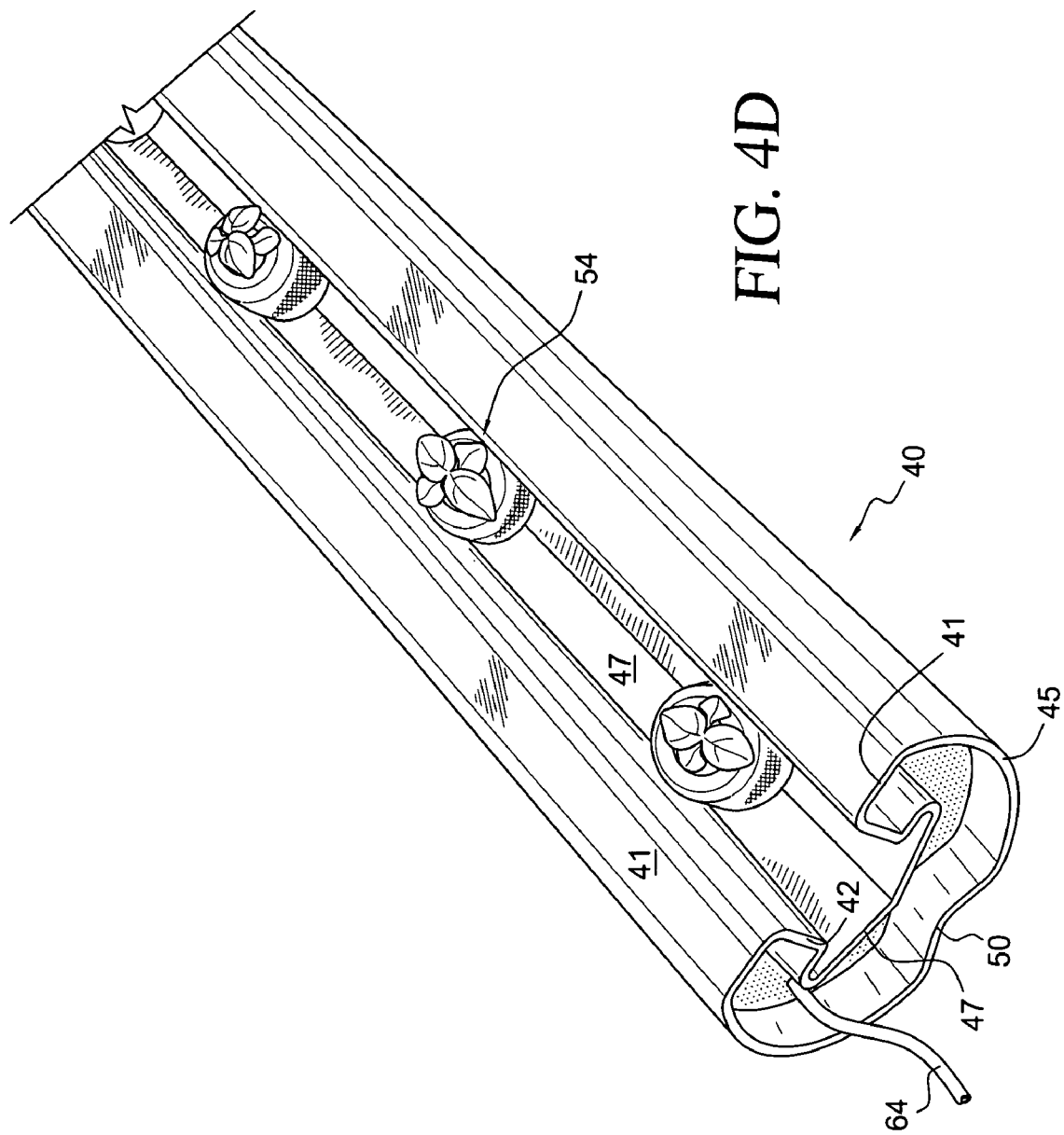
FIG. 4D is a perspective end view, broken away, of the hollow member of FIG. 4A.

As shown in FIGS. 4A-D, a preferred array comprises a plurality of linear hollow members 40 arranged side-by-side about a common horizontal axis in a drum-like configuration (FIGS. 1 and 2). In a preferred embodiment, each hollow member 40 has side walls 45, top walls 41, an indented wall portion 50 and opposite thereof interior walls 42, 43 and 47 forming a recessed linear slot. The base of the slot, formed by angled walls 47, contains a series of apertures 46 adapted to receive plant holders 55, 57 for plants 54 (FIG. 4C).

Figure 8:
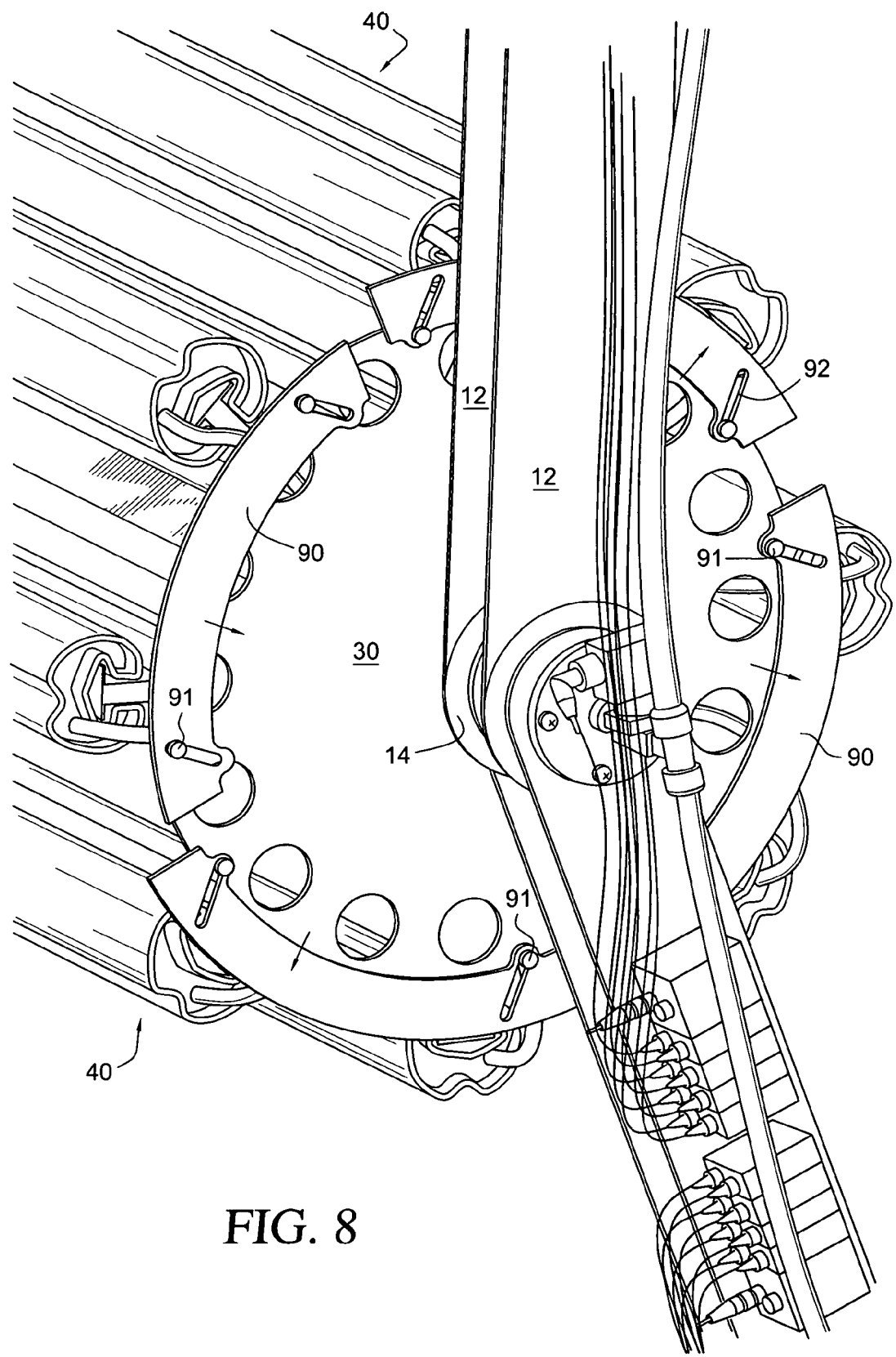
FIG. 8 is a perspective end view, partly broken away, of a plant array of the invention showing hollow members mounted and restrained in the array.

Wall portions 43 form lateral grooves which are adapted to receive mounting member 32 (FIG. 8). Wall portions 42, 41 and 45 together form reservoirs 48 on each side of the slot which carries plants 54 which grow inwardly towards a centrally located light source 18 (see FIG. 6B for example). Reservoirs 48 capture and hold water when the plants in a given array are generally inverted.

Rib 50 can serve two functions in the embodiment shown. It first acts as a stop for the plant holders 55, 57 when inserted in apertures 46 and secondly if defined two additional reservoirs for water when the plants in a given array are generally upright.

Water tight end caps 60 are fitted into the ends of each hollow member 40 (FIG. 4E) and are recessed to allow mounting tabs 32 to slide into grooves 43 (FIG. 4D). End caps 60 have surfaces 61, 63 and 65 that mate snugly with the interior of wall portions 41, 42, 43, 47 and 50 of member 40.

Figure 7:
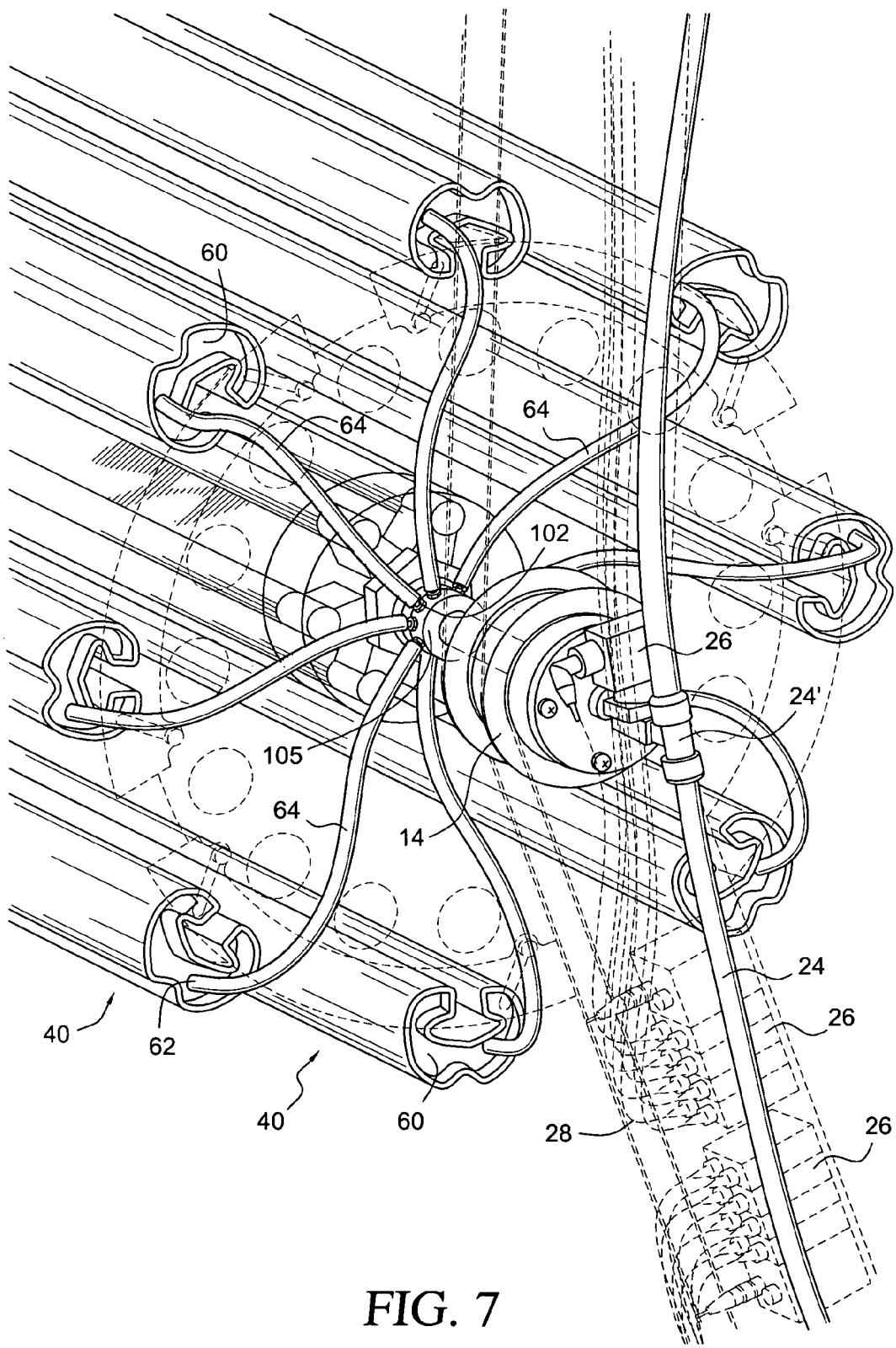
FIG. 7 is an end view, partly broken away and partly in phantom, showing water connections to the hollow members in an array.

As shown in FIG. 7, aperture 62 in the ends caps at one end of the members 40 connect with water lines 64 which are connected to individual fittings 102 on water manifold 105 which is fed with water for the plants from main water line 24 via coupling 24' and solenoid valve 26 which opens and closes in response to commands from a controller which is programmed with a desired watering protocol.

In this manner all the plants in a given carousel are watered simultaneously by delivering water (and plant chemicals as needed) to all the hollow members 40 in an array at the same time. This maintains even weight distribution within each array for smooth, balanced rotation. Water line 8 connects to water line 24 and each solenoid valve 27 receives commands from the controller via lines 28 which emanate from junction boxes 26' carried on links 12 (FIG. 6A).

Figure 4F:
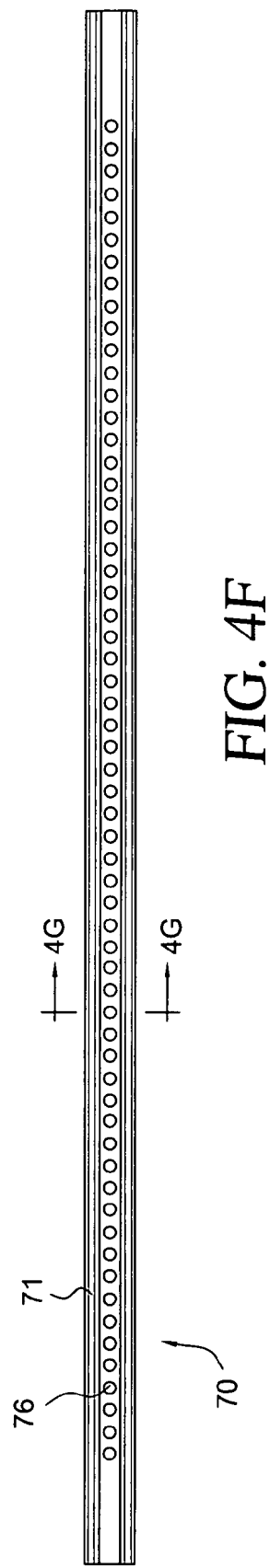
FIGS. 4F-H are views corresponding to FIGS. 4A, B and E showing an alternate configuration of the hollow member.
Figure 4H:
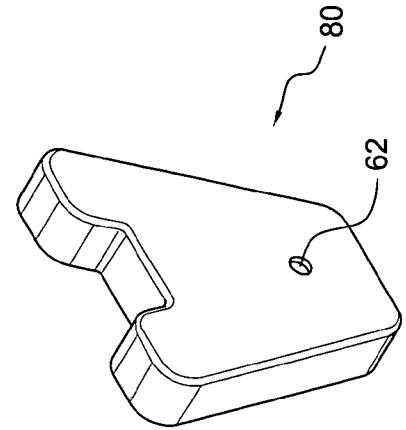
Figure 4G:

An alternate embodiment of the hollow member is shown in FIGS. 4F-H wherein member 70 has reservoirs 78 formed by wall portions 71 and 75 and plant receiving apertures 76 in the base of the linear slot adjacent wall portion 71. End caps 80 with water apertures 62 fir snugly into the ends of member 70 in the same fashion as described for end cap 60.

FIGS. 3 and 8 shows a preferred embodiment for mounting hollow members in an array. Vertical end members 30 have spaced mounting tabs 32 extending into the interior of an array at right angles. As described previously, the ends of the hollow members 40 have lateral grooves 43 into which the tabs 32 slide. At one end of an array, arcuate stops 90 are radially movably mounted to end member 30 via adjustable screw pins 91. A screw shaft and wing nut arrangement can be used in place of pins 91 for easier operation.

To mount a hollow member 40, an arcuate stop is lowered on member 30 in a radial direction as shown by the arrow in FIG. 8. This allows the hollow member 40 to slide past the plane of end member 30 so that the opposite end can be slid back over tabs 32 on the opposite end 30 as shown in FIG. 3. Stop 90 is then raised as shown by the arrows in FIG. 8 and held in place by pins 91. Stops 90 thus prevent lateral movement of the hollow members during the growth cycle.

As shown in FIG. 3, hollow members 40 are mounted to every other available position on end member 30. This makes it possible to plant, tend growing plants and crop without removing the hollow members from an array. Thus, the arrays in a carousel are moved in and out of a loading and unloading position located near the plant floor at operator height.

The diameter of end member 30 will be determined by the size of the crop being grown. It may also desirable to construct end member 30 with telescoping sections to enlarge an array to accommodate growing plants.

Plant holders 55 are preferably made of thermoplastic with some expansion ability to allow for swelling as the plants grow and to provide for a watertight fit in apertures 46. Holders 55 can be filled with particulate material 57 such a peat, ground cocoa shells, diatomaceous earth, mica and like materials for organic plant growth. The material 57 is preferably light like peat or cocoa shell. The holder 55 has one or more bottom openings to facilitate water and nutrients getting to the plants. Material 57 can also be made of an inert, reusable substance such as stainless steel wool and the like.

Figure 5:
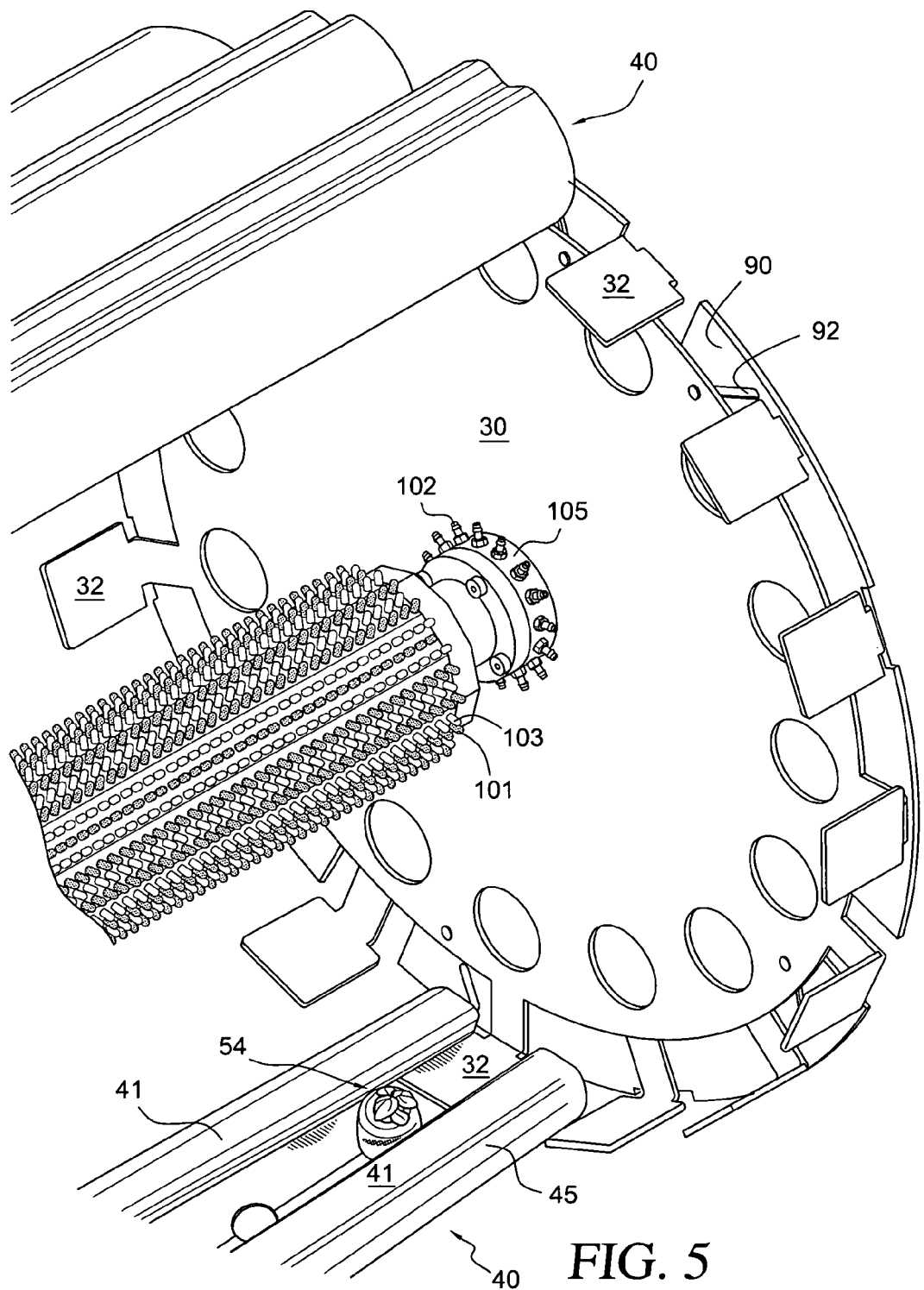
FIG. 5 is a perspective interior end view, broken away, of the plant array shown in FIG. 1.

Light source 18 delivers growth promoting UV light during selected intervals to the plants growing on the interior of the arrays. The light source 18 is mounted generally at the center of each array and is powered by electrical input wires 60. The light source can extend along the horizontal axis of a array. The light source can be a fluorescent tube or tubes, a light emitting diode (LED), a high pressure sodium lamp, other metal halide lamps or an ordinary light bulb or bulbs in the center of the array. As shown in FIG. 5, the light source can be made of LEDs 101 and 103 which have different output spectra which allows the growing protocol to provide ideal light for maximum rate of plant growth.

Light emitting diodes are preferred as the light source because they allow remote control of the spectrum of light within the array to accommodate and control specific stages of plant growth and development. LED's draw approximately 25% less power than fluorescent lamps. This makes the use of solar power feasible which is especially beneficial in remote regions.

It has been found that less energy is required to germinate seeds into seedlings and a preferred practice is to seed a series of flats or trays or side-by-side banks of hollow members before mounting in an array; the seeds are quickly germinated under artificial light and are mounted to into arrays as described herein after the seeds sprout. Plants can also be germinated in plant holders 55, 57 in trays exposed to periods of light and later inserted into apertures 46 in the hollow member slots for mounting in the arrays and further plant growth to maturity and cropping.

In general, plants are known to respond to gravity, light and nutrients. The gravity response predominates which means plants will inherently grow against gravity even if it means growing away from a light source. Thus, plants that are inverted will turn and grow away from the source of gravity regardless of where the light is coming from.

The gravity response is neutralized by regulating the rotational speed of the arrays to create micro-gravity which causes the rotating plants to grow towards the central light source. Rotation of the arrays at selected rates, in effect, tricks the plants into growing towards the light source regardless of their position in the array and their rotation about its horizontal axis.

Rotational speeds can be determined empirically and will vary between about 1 and 60 rotations per hour (rph) or between 1 and about 10 revolution per minute (rpms), preferably between about 1 and about 5 rpms, depending on the crop being grown. Thus, stunted or flat or spreading growth in a plant that normally grows upright can be corrected by increasing the rpms in increments until the plants resumes their normal growth pattern. Strawberries have been found to grow prolifically at an rpm of 0.25 with aided pollination as described in U.S. application Ser. No. 11/808,787, filed Jun. 13, 2007, now U.S. Pat. No. 7,559,173, entitled "Method and Apparatus for Growing Plants in Carousels."

Rotational speed of the arrays, watering with nutrients, gas supply, temperature, air circulation, light source and periods of light and darkness are selected for optimum plant growth as illustrated in the examples.

Simultaneous watering insures approximately equal or even weight distribution among growing plants. This allows rotational rates as described herein and prevents unbalancing which can have an adverse effect on the operation of a carousel such as shown on FIG. 1. For example, uneven weight distribution can cause uneven bearing wear, drive motor overheating and failure, stressing of linkages, seams and joints and like problems leading to equipment breakdown and failure. Because all the plants in an array receive substantially the same light, nutrients and rotational speed, increase in weight due to plant growth is also evenly distributed thus maintaining smooth balanced rotation.

Different crops can be grown in the same array but growth rates and crop weight should be considered to maintain even weight distribution and balance. Two diverse crops with different growth rates and/or crop weights can be grown is one array without creating an imbalance by having like plants grown in opposite array quarters. For example, leaf lettuce can be grown in quarters 1 and 3 while Romaine lettuce is grown in quarters 2 and 4.

A typical factory for growing plants according to the invention includes side-by-side carousels generally shown in FIG. 10. Water and plant nutrients are delivered to the arrays as described herein.

Figure 11:
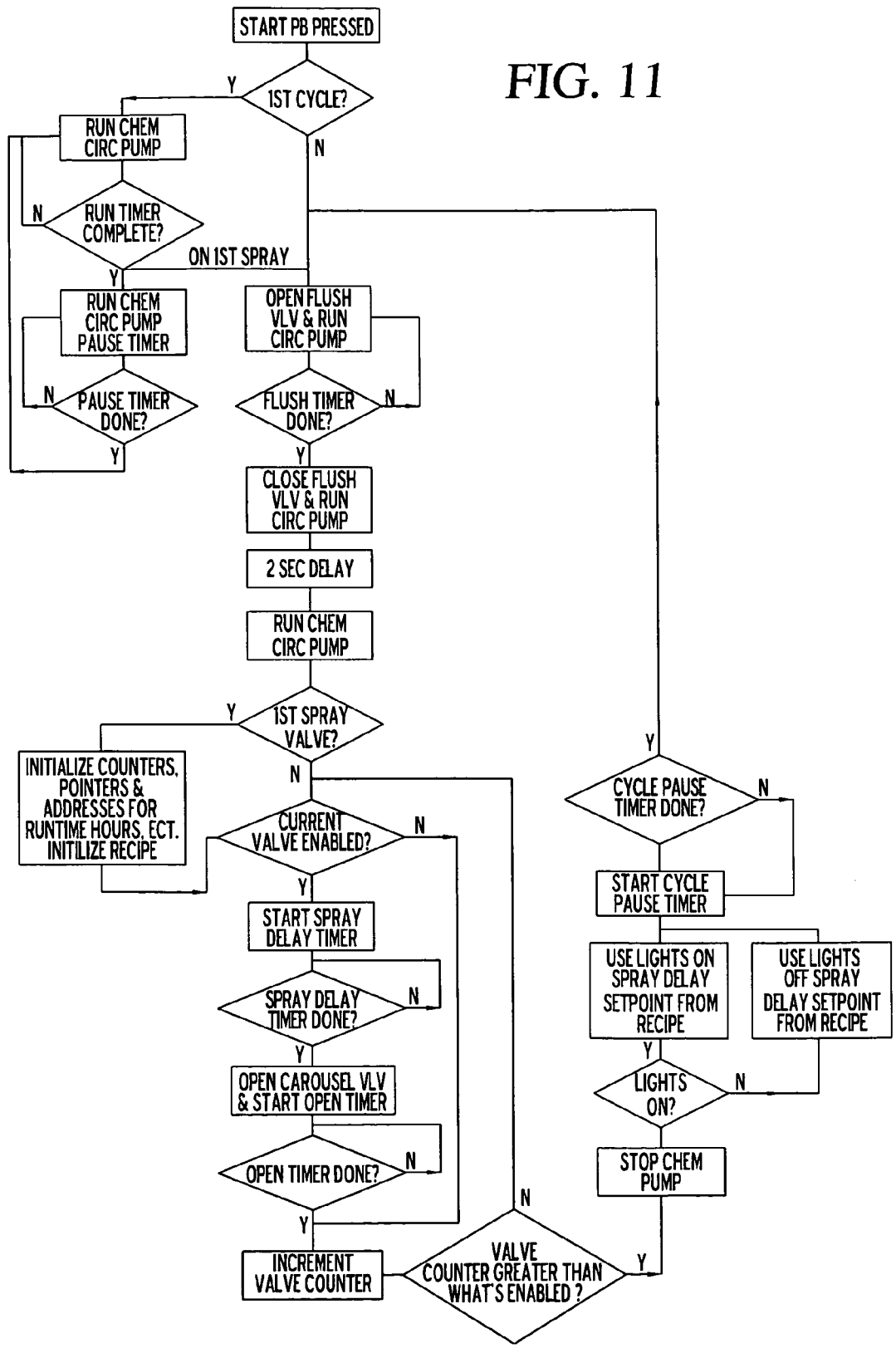
FIG. 11 is a flow diagram illustration a computer program for controlling the watering cycles for a bank of carousels such as show in FIG. 10.

FIG. 11 is a flow diagram for a customized computerized controller to select and regulate rotation speeds for the arrays in a given carousel, light cycles and feed rates for water and nutrients. In the embodiment shown an Omorn CJ1 PLC was customized to operate a bank of carousels such as shown in FIG. 10.

The software controls all moving parts; rotation of the arrays 10, rotation of the carousel 11, light cycles and the injection of water through controlled solenoid valves 26. For growing strawberries, for example, the speed of the rotation of the arrays is set at 1 hr per revolution which is only changed to manipulate or trim the plants and for replanting and cropping. The light cycles are pre set and the software turns them on and off at the set parameters. The water solution is injected into the arrays as needed up two 3 times/day. The software turns on a pump and opens a flush valve for 1 min; the flush valve is then closed to maximize pressure of 100 psi to cycle out old water. Valves 26 are then opened in sequence for each array in a carousel.

The interior of an array can be exposed to different gas mixtures. The selected gas can be carbon dioxide or oxygen and fresh batches of water and plant nutrients are preferably delivered to the growth medium without recirculation. Oxygen added to the water stimulates root growth and the injection of carbon dioxide enhances plant growth and will eliminate mites and insects if they infiltrate a array, thus eliminating the use of pesticides. The plant atmosphere, or the atmosphere in a smaller enclosure for the carousels, can be easily controlled using know methods and systems used for clean rooms and the like, for example.

Basil grown from seed and safflower seeds grown from seedlings are examples of plants that can be grown in high yields according to the invention. The invention is especially suited for growing leafy green vegetables, tomatoes, fruits and berries such as strawberries. The following is a representative list of crops that can be grown according to the invention:

Herbs
*Aloe Vera*
*Artemisia*—*Artemisia annua*
Basil—Ararat basil—Green Globe Basil—Sweet Salad Basil—Thai Basil
Cilantro—Spice Coriander—Santo Cilantro
*Echinacea*—*Echinacea purpurea*
*Eucalyptus*—*Eucalyptus globulus*—Peppermint Eucalyptus
Funnel
Golden seal
Lemon balm
Milk Thistle
Oregano—Greek Oregano—Italian Oregano—Mexican Oregano
Paprika—*Capsicum annuum*
Parsley—Aphrodite parsley—Italian Parsley—Plain parsley
Peppermint
Chile Pepper—Habanero—Jalapeno—Tabasco—Scotch Bonnet—Cayenne
Sage—Extrakta Sage—Garden Sage
St. Johns Wart
*Yucca*—*Yucca glauca*
Vegetables
Beans—Golden Wax—Tender green
Broccoli—De Cicco
Cauliflower—Snowball
Lettuce—Butterhead—Loose leaf—Oak leaf Red—Romaine
Spinach—Mustard—New Zealand Peppers—Cal wonder—Golden Cal Wonder—Sweet Chocolate—Jamaican Yellow
Tomato—Roma—Sweetie—
Pea—Mammoth melting—Oregon Sugar pod—
  Berries
Blueberries—wild and cultured
Strawberries—all
Cranberries
Blackberries
Raspberries
  Biopharmaceuticals
Natural Biocompounds (therapeutic biocompounds native to plant species):

The plants listed below express biocompounds native to them as secondary metabolites; genetic engineering of the plants is not involved.

| Plant | Compound | Indication | Drug |
|---|---|---|---|
| Madagascar Rosy Periwinkle | Vincristine | Cancer | Vincristine |
| | Vinblastine | Cancer | Vinblastine |
| | | Cancer | |
| | Vinorelbine | Cancer | Vindesine |
| | | Cancer | Vinflunine |
| | Ajmalicine | Hypertension | Raubasine |
| May Apple | Podophyllotoxin | Cancer | Etoposide |
| | | Cancer | Teniposide |
| | | Cancer | Etopophos |
| | | Genita warts | Podophyllotoxin |
| English Yew | 10-DAB | Cancer | Docetaxel |
| Artemisia | Artemisinin | Malaria | Artemether |
| Poppy | Morphine | Pain | Codeine |
| | | Pain | Morphine |
| | | Erectile dysf. | Apomorphine |
| | | Parkinson's | Apomorphine |
| | Thebane | Pain | Oxycodone |
| Foxglove | Digitalis | Heart Disease | Digoxin |
| Indian Snakeroot | Reserpine | Hypertension | Reserpine |
| | Ajmalicine | Hypertension | Raubasine |
| Mex. Wild Yam | Diosgenin | Inflammation | Cortisone |
| | | Hormonal imbalance | Progesterone Other steroids |

Vincristine is used to treat leukemia, non-Hodgkin's lymphoma (becoming more common as AIDS patients live longer), Kaposi's Sarcoma, breast and lung cancers and certain other cancers. Vinblastine has been used for tumor treatment, and is recommended for generalized Hodgkin's disease and resistant choricarcinoma. See, Jordan, M. A. and Wilson, L., Microtubules as a Target for Anticancer Drugs, *Nature Reviews*, 4 (April 2004) 253.

Vinblastine and vincristine used in combination chemotherapy has resulted in 80% remission in Hodgkin's disease, 99% remission in acute lymphocitic leukemia, 80% remission in Wilm's tumor, 70% remission in gestational choricarcinoma, and 50% remission in Burkitt's lymphoma. (See O'Reilly et al, National Tropical Botanical Garden Web site, Kalaheo, Hi.).

Transgenic or recombinant biopharmaceuticals, i.e., therapeutic biocompounds from foreign DNA inserted in a plant host such as tobacco, safflower and alfalfa can also be produced using the invention.

Recombinant biopharmaceuticals encompass a wide range of therapeutic proteins and subunit vaccines, and include biogeneric or biosimilar compounds such as insulin, erythropoietin (EPO), human growth hormone (somatropin) (hGH) and granulocyte colony-stimulating factor (G-CSF).

Natural biocompound producing plants can be grown and cultivated to advantage using the invention. Growing such plants under controlled conditions possible with the invention can result in an increase in compound expression with better consistency of expression. Moreover, purer compounds can be extracted from the plants when using the invention due to the absence of contaminants such as pesticide residues and toxins from disease and insect, bird and animal excreta found in plants grown in the field, and often in greenhouse plants.

Upon harvesting the plants cultivated using the invention, the compounds of interest can be extracted and purified using various separation technologies such as steam distillation, solvent extraction, filtration and chromatography. Examples of extraction of natural product compounds are contained in King, M. B. & Bott, T. R., eds., *Extraction of Natural Products Using Near Critical Solvents*, Glasgow: Blackie Academic & Professional (1993). An example of a chromatography process for purifying proteins from transgenic tobacco is described by Holler, Vaughan and Zhang, "Polyethyleneimine Precipitation Versus Anion Exchange Chromatography in Fractionating Recombinant Glucuronidase from Transgenic Tobacco Extract", *Journal of Chromatography A*, 1142 (2007) 98-105.

Heat build up in the arrays, which normally operate at room temperature, can be controlled by regulating the interior temperature of the plant enclosure.

The ability to confine the entire system allows for minimal or no product loss from rodents or insects. Plants are less likely to contract viruses than on the ground. A controlled environment allows the plants to grow in a sterile atmosphere reducing bacterial and pest infestation without the use of poisons or other insecticides or fungicides. The arrays are self pollinating for fruits and vegetables that require pollination. This is accomplished as shown in FIG. 15 or by simply rotating the arrays; pollen will fall and land on the other plants. No bees are needed.

In one aspect, the invention increases the amount of growing space for a given footprint. For example, in a 12,000 square foot plant the actual footprint of the carousels can be 6,000 square feet. This equals 50,000 square feet of level growing space.

Water can be processed through a reverse osmosis tank to recycle the fertilizer. No soil depletion takes place and no crop rotation is required.

The invention is especially useful is providing a local source of fresh vegetables and fruit with low capital investment. Shipping costs are minimized and use of the arrays is not restricted by region or growing season: any location with a supply of water and power is suitable. Plants can be grown in accelerated growing cycles to meet everyday food needs as well as specialized requirements for specific needs such as by nutraceutical companies. World hunger needs can be addressed locally and high quality seedlings can be grown locally or on site for reforestation purposes. The demand for organically grown products is also met not only for foods but also for nonfood products like cosmetics and like products.

The invention also offers environmental advantages such as reduced fossil fuel use in transporting product to market, energy efficiency, reduced and negligible nutrient pollution, elimination of the use of toxic pesticides and fertilizers, controlled and reduced water usage and the reuse of abandoned or idle facilities.

EXAMPLES

The following examples are not intended to limit or restrict the invention in any way.

Example 1

Periwinkle

Fertilizer: OMRI Listed.

Pura Vida Organics. Manufactured by Technaflora Plant Products LTD. 1533 Broadway street #125 Port Coquitlam, BC. Canada. V3C 6P3, Phone 604-468-4769. www.technflora.com Pura Vida Organics Grow 6-4-3
Total (N) 6%
6% total Nitrogen
Available Phosphate (P2O5) 4%
Soluble Potash (K2O) 3%
Magnesium (Mg) 0.5%
Boron (B) 0.02%
Soluble Copper (Cu) 0.05%
Iron (Fe) 0.1%
Manganese (Mn) 0.05%
Zink (Zn) 0.05%

Derived from: Seaweed Powder, Kelp Extracts, Alfalfa, Molasses, Potassium Sulfate, Epsom salt, solubar, Copper Sulfate, Iron Sulfate, Manganese Sulfate, Zinc Sulfate.

Pura Vida Organics Bloom 2-6-6
Total Nitrogen (N) 2%
2% Organic Nitrogen
Available Phosphate (P2O5) 6%
Soluble Potash (K2O) 6%
Magnesium (Mg) 0.5%
Boron (B) 0.02%
Soluble Copper (Cu) 0.05%
Iron (Fe) 0.1%
Manganese (Mn) 0.05%
Zink (Zn) 0.05%

Derived from: Seaweed Powder, Kelp Extracts, Alfalfa, Molasses, Potassium Sulfate, Epsom salt, solubar, Copper Sulfate, Iron Sulfate, Manganese Sulfate, Zinc Sulfate.

Fertilizer was mixed at the following rate.
2 parts Grow to 1 part Bloom
General Conditions.

All water used was filtered through a reverse osmosis filter system. The water was buffered with 20% carbon filtered city water. Water then had 2 ml/L of 35% hydrogen peroxide added and was left to stand 20 minutes before use.

Carbon Dioxide levels were set to 500 ppm.

A 1350GPM high pressure pump was used for all watering times listed.

The plants were grown in four arrays as shown in FIG. 1 using 576-watts of fluorescent light consisting of four 96-watt 5000 K and two 96-watt 4100 K T8 bulbs as the light source 18 and hollow plant carrying members 40 as shown in FIG. 4AE. The photoperiod was 16 hours.

Array rotation was set at one full rotation every 48 minutes.

Temperature was set to 88 F during the day with 35% humidity and 77 F during the night with 50% humidity.
Planting The peat pucks were hydrated in a 25 ppm fertilizer solution at a pH of 5.6. The pucks were kept in darkness for 14 days until all seeds had germinated. After 6 days the seeds started to sprout. Sprouted seeds were moved daily to trays under 18-watts/sf fluorescent and allowed to grow until day 14.
Transplant The peat pucks containing the sprouted plants were inserted into the 24 plant stations 46 located in the bottom of the of the slot in each hollow member. The hollow member was then assembled on to the vertical carousel. Four arrays were used, one with the full sixteen members, two with eight, and one with fourteen.
In the Array Day 14—500 ml of fertilizer solution was pumped into each hollow member at a pH of 4.6 and 50 ppm. The plants were misted daily with a 3% solution of hydrogen peroxide for the first 14 days in the array.

Day 20—The first set of true leaves opened.

Day 26—The second set of true leaves opened.

Day 27-Day 32. Plants were watered three times a day with the valves set to open for one second using the same Ph and PPM as Day 14.

Day 33-Day 35. Valve open time was changed to two seconds five times a day. Fertilizer solution was changed to 100 PPM at a pH of 4.5.

Day 37—Valve open time was reduced to zero seconds due to dripping from the peat pucks.

Day 40-Day 43. Valve open time was set to one and one half seconds four times a day. Fertilizer solution was mixed the same as day 33.

Day 44-Day 46. Valve open time was set to two seconds six times a day. Fertilizer solution was mixed at 125 ppm with a pH of 4.5.

Day 47-Day 52. Valve open time was set to two seconds eight times a day with the same fertilizer solution as Day 44.

Day 53-Day 56 Valve open time was changed to three seconds 10 times a day. Fertilizer solution was changed to 150 ppm at 5.0 pH.

The plants were harvested on day 70 with each hollow member producing on average one pound of wet leaf mass from the arrays with eight hollow members. One half to two thirds of a pound was produced per member from the fourteen and sixteen member arrays.

Example 2

Spinach

Fertilizer: OMRI Listed.

Pura Vida Organics. Manufactured by Technaflora Plant Products LTD. 1533 Broadway street #125 Port Coquitlam, BC. Canada. V3C 6P3, Phone 604-468-4769. www.technflora.com Pura Vida Organics Grow 6-4-3
Total (N) 6%
6% total Nitrogen
Available Phosphate (P2O5) 4%
Soluble Potash (K2O) 3%
Magnesium (Mg) 0.5%
Boron (B) 0.02%
Soluble Copper (Cu) 0.05%
Iron (Fe) 0.1%
Manganese (Mn) 0.05%
Zink (Zn) 0.05%

Derived from: Seaweed Powder, Kelp Extracts, Alfalfa, Molasses, Potassium Sulfate, Epsom salt, solubar, Copper Sulfate, Iron Sulfate, Manganese Sulfate, Zinc Sulfate.

Pura Vida Organics Bloom 2-6-6
Total Nitrogen (N) 2%
2% Organic Nitrogen
Available Phosphate (P2O5) 6%
Soluble Potash (K2O) 6%
Magnesium (Mg) 0.5%
Boron (B) 0.02%
Soluble Copper (Cu) 0.05%
Iron (Fe) 0.1%

Manganese (Mn) 0.05%
Zink (Zn) 0.05%

Derived from: Seaweed Powder, Kelp Extracts, Alfalfa, Molasses, Potassium Sulfate, Epsom salt, solubar, Copper Sulfate, Iron Sulfate, Manganese Sulfate, Zinc Sulfate.

Fertilizer was mixed at the following rate.

2 parts Grow to 1 part Bloom

General Conditions.

All water used was filtered through a reverse osmosis filter system. The water was buffered with 20% carbon filtered city water. Water then had 2 ml/L of 35% hydrogen peroxide added and was left to stand 20 minutes before use.

Carbon Dioxide levels were set to 500 ppm.

A 1350GPM high pressure pump was used for all watering times listed.

The plants were grown using 576-watts of fluorescent light consisting of four 96-watt 5000 K and two 96-watt 4100 K T8 bulbs. The photoperiod was 16 hours.

Array rotation was set at one full rotation every 48 minutes.

Temperature was set to 72 F during the day with 60% humidity and 65 F during the night with 50% humidity.

Planting

For the first 24 hours, RO water is used for irrigation instead of the nutrient solution. This reduces osmotic pressure of the solution and allows the seed to imbibe additional moisture. The peat pucks are top-watered with RO water during the first 24 hour period.

The plants remain in darkness for the initial 24 hours. Thereafter, the light level is maintained at 250 micromol m-2s-1 with a photoperiod of 12 hours. The temperature is set at 20° C. (68° F.). The seed trays are covered with plastic humidity covers for the first 48 hours to ensure high relative humidity and prevent desiccation. After the humidity covers had been removed the seed trays were sprayed twice a day with RO water. Once a day using a 3% solution of hydrogen peroxide in the water and once a day using a nutrient solution mixed at a pH of 5.8 and a EC of 1.2 up until day fourteen.

Transplant

The peat pucks containing the sprouted plants were inserted into the 24 plant stations located in each hollow member. The hollow member was then assembled on to a four array vertical carousel filling the arrays with fourteen plant carrying members.

In the Array

Day 14—500 ml of fertilizer solution was pumped into each hollow member at a pH of 5.8 and EC of 1.2. The plants were misted daily with a 3% solution of hydrogen peroxide for the first 7 days in the array.

Day 20—The Valve open time was set to two second seven times a day. The fertilizer solution was mixed to 1.2 EC at a pH of 5.6.

Day 25—The valve open time was changed to three and one half seconds seven times a day with the same fertilizer solution as day 20

Day 27—The valve open time was changed to two seconds seven times a day due to dripping. Fertilizer solution was unchanged.

Day 29—The valve open time was changed to two point two seconds seven times a day using the same fertilizer solution Day 33—The valve open time was changed to two point four seconds. The fertilizer solution was increased to an EC of 1.4 at a pH of 5.5.

Day 35—The valve open time was increased to three seconds nine times a day with the same fertilizer solution as day 33

Day 39—The valve open time was reduced to zero seconds due to dripping.

Day 41—The valve open time was set to three seconds seven times a day using the same fertilizer solution as day 33

The plants were harvested 33 days after transplant and each plant yielded on average 5 oz of wet leaf mass.

Example 3

Strawberries

Fertilizer: OMRI Listed.

Pura Vida Organics. Manufactured by Technaflora Plant Products LTD. 1533 Broadway street #125 Port Coquitlam, BC. Canada. V3C 6P3, Phone 604-468-4769. www.technflora.com Pura Vida Organics Grow 6-4-3

Total (N) 6%

6% total Nitrogen

Available Phosphate (P2O5) 4%

Soluble Potash (K2O) 3%

Magnesium (Mg) 0.5%

Boron (B) 0.02%

Soluble Copper (Cu) 0.05%

Iron (Fe) 0.1%

Manganese (Mn) 0.05%

Zink (Zn) 0.05%

Derived from: Seaweed Powder, Kelp Extracts, Alfalfa, Molasses, Potassium Sulfate, Epsom salt, solubar, Copper Sulfate, Iron Sulfate, Manganese Sulfate, Zinc Sulfate.

Pura Vida Organics Bloom 2-6-6

Total Nitrogen (N) 2%

2% Organic Nitrogen

Available Phosphate (P2O5) 6%

Soluble Potash (K2O) 6%

Magnesium (Mg) 0.5%

Boron (B) 0.02%

Soluble Copper (Cu) 0.05%

Iron (Fe) 0.1%

Manganese (Mn) 0.05%

Zink (Zn) 0.05%

Derived from: Seaweed Powder, Kelp Extracts, Alfalfa, Molasses, Potassium Sulfate, Epsom salt, solubar, Copper Sulfate, Iron Sulfate, Manganese Sulfate, Zinc Sulfate.

Fertilizer was mixed at the following rate

Growth Formula week 1 through week 4

2 ml Grow/Liter Fresh Water 1 ml Bloom/Liter Fresh water

Bloom Formula Week 5 to harvest 2 ml Bloom/Liter fresh water 1 ml Grow/Liter fresh water Fungicide/Bactericide: OMRI Listed.

OxiDate. Manufactured by BioSafe Systems LLC. 22 Meadow Street East Hartford, Conn. USA, 06108. Phone 860-290-8890.

OxiDate: Active ingredient 27% Hydrogen Dioxide. 73% other ingredients (proprietary blend of stabilizers and buffering agents).

Sure to Grow Media: 6062 Holdings, LLC, 23230 Chagrin Blvd., Suite 900, Beachwood, Ohio 44122. Phone 216-360-8116

Bare root dormant strawberry plants were supplied by Kopps plants (PO Box 441, Watsonville, Calif. 95077-441 USA. Phone 831-724-6009) from a high elevation California field. The plants were transferred to a refrigerated truck and delivered to the Romulus Mich. facility 5 days later. Once received the plants were transferred to 5 gallon buckets, washed and then allowed to soak in a 300:1 solution of Oxi-Date for ½ hour.

General Conditions.

All water used was filtered through a reverse osmosis filter system and an Ultraviolet light system. The water was buffered with 20% carbon filtered city water to 10 micron.

Carbon Dioxide levels were set to 350 ppm.

A 1350GPM high pressure pump was used for all watering times listed.

The plants were grown using 576-watts of fluorescent light consisting of four 96-watt 5000 K and two 96-watt 4100 K bulbs. The photo period was 16 hours.

Array rotation was set at one full rotation every 48 minutes.

Day 1 through day 14 the temperature was kept at 74 F inside the array with the humidity level at 90%.

Day 15 to the end the temperature was set to 65 F inside the array with the humidity level set at 60%.

The 1st fruit stem of flowers were pruned off and fruit stems there after were pruned to no more than one stem per plant at a time with no more than five flowers per stem.

Planting.

Day 1—The plants were first wrapped in Sure To Grow media; our neoprene plant holders were then wrapped around the plants at the base of the crown. The plants were then inserted into a plant station within the trough-like member that had already been filled with a 4" wide Sure To Grow strip running internally from end to end. The trough-like members were assembled on to the vertical carousel using the configuration of 14 ribs per sphere and injected with 1.5 L each of the Growth formulated fertilizer solution at a pH of 5.0. Day 11 a second carousel was planted using the same process.

In The Array

Day 6—The mediums were injected with 100 ml of fertilizer solution once daily at 4.0 pH and a PPM of 500

Day 12—The mediums were injected with 100 ml of fertilizer solution once daily at 4.0 pH and a PPM of 500

Day 15—The mediums were injected with 200 ml of fertilizer solution twice daily at 4.0 pH and a PPM of 500

Day 16-20 The mediums were injected with 150 ml of fertilizer solution twice daily at 4.0 pH and a PPM of 550

Day 21-25 The mediums were injected with 150 ml of fertilizer solution twice daily at 3.5 pH and a PPM of 600

Day 26-34 the mediums were injected with 100 ml fresh water at a pH of 6.5 twice daily Day 35-37 no solution was pumped into the mediums Day 38-41 The medium was injected with 100 ml of fertilizer solution once a day at 4.0 pH and a PPM of 250

Day 42 The medium was injected with 100 ml of fertilizer solution twice with pH at 4.0 and PPM at 400

While this invention has been described as having preferred sequences, ranges, steps, materials, structures, features, and/or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the appended claims.

What is claimed is:

1. Apparatus for growing plants comprising linear plant carrying members in a horizontal drum-like configuration, vertical end members for mounting said plant carrying members having spaced mounting means adjacent the periphery of each end member, the ends of the plant carrying members having means to receive said mounting means, the mounting means of one end member allowing movement of a plant carrying member beyond the plane of said one end member when the mounting means thereof engage said means to receive thereby facilitating the same engagement at the other of said end members.

2. Apparatus of claim 1, wherein the plant carrying members are hollow members adapted to carry plants that grow inwards towards a light source and having a recessed slot facing said light source having a plurality of apertures at the base thereof for receiving plant holders and defining, with the outer walls of the hollow member, reservoirs on each side thereof for holding water when the plants are generally inverted.

3. Apparatus of claim 2, wherein the hollow member has a raised rib opposite said slot.

4. Apparatus of claim 2, wherein said slot includes lateral grooves for mounting the hollow members in the array.

5. Apparatus of claim 2, wherein each hollow member includes conforming end caps for enclosing the interior thereof.

6. Apparatus of claim 1, wherein plants grow inwards towards a centrally located light source and said plant carrying members are hollow members each having a recessed slot facing said light source having a plurality of apertures at the base thereof for receiving plant holders and defining, with the outer walls of the hollow member, reservoirs on each side thereof for holding water when the plants are generally inverted.

\* \* \* \* \*